J. BALDWIN.
SPOOL AND BOBBIN.

No. 173,880. Patented Feb. 22, 1876.

WITNESSES
Horace E. Morse
Edward A. Stock

INVENTOR
James Baldwin
by J. H. Adams
Atty

UNITED STATES PATENT OFFICE.

JAMES BALDWIN, OF MANCHESTER, NEW HAMPSHIRE.

IMPROVEMENT IN SPOOLS AND BOBBINS.

Specification forming part of Letters Patent No. 173,880, dated February 22, 1876; application filed July 26, 1875.

*To all whom it may concern:*

Be it known that I, JAMES BALDWIN, of Manchester, in the county of Hillsborough and State of New Hampshire, have invented an Improvement in Spools and Bobbins, of which the following is a specification:

My invention relates to an improvement in spools used in spinning machinery; and it consists in a means of securing the head of the spool to its shaft or barrel, so that while the head may be securely attached it may also be readily detached for repairs or transportation. When the head is glued to the shaft, as has been the practice, the parts cannot be readily detached in case of necessity without injury to the spool. A square nut has also been used for attaching the head to the shaft; but this mode requires the use of a wrench when the attachment is made, and the nut, after being in use some time, is liable to become loosened, and consequently objectionable.

My invention consists of a nut of peculiar construction, which is inserted in a circular hole made transversely in the shaft near the head of the spool, and is used in connection with a screw-bolt, forming a part of the journal of the spool, by means of which the head is securely attached to the shaft without liability of changing position when once fixed in place.

Figure 1:
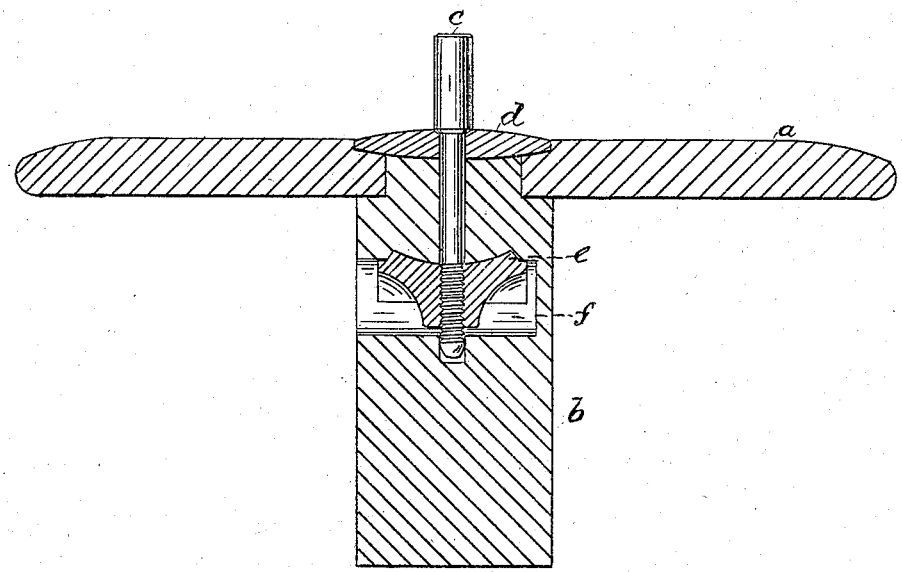
Figure 2:
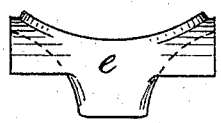

Referring to the drawings, Figure 1 represents one end of a spool, with the head attached, embodying my invention. Fig. 2 represents the nut used in connection with the combined journal and screw-bolt.

$a$ represents the head of a spool. $b$ is a portion of the shaft to which the head is attached. $e$, Fig. 2, is a nut of oblong form, the face of which, or that portion toward the head, is concave, and having its edges somewhat sharp, and with a projecting portion on its opposite side. The nut $e$ is placed in the hole bored transversely in the shaft near the head. $c$ is the journal of the shaft of the spool. It is formed with a screw on its inner end, and serves as a bolt to the nut $e$. $d$ is a metal washer, formed with convex sides, and is fitted on the outer side of the head, as shown in Fig. 1, and bears against shoulders on the journal $c$. The nut $e$ being placed in the cavity of the shaft or barrel $b$, as shown in Fig. 1, the head $a$ is placed upon the end of the shaft. The washer $d$ is then put in place, and the journal $c$ inserted in the shaft. The screw on the end of the journal engages with the nut, and on turning the journal the nut is drawn up tightly against the side of the cavity. The sharp edge of the nut embeds itself in the shaft, and is prevented from turning, and insures a secure fastening of the nut in place. By unscrewing the journal $c$ the nut is released, and the head is easily removed.

I am aware of the patent to Day and Folsom, September 7, 1869, No. 94,576, where the shaft end is screwed into the disk, and the shaft is further secured by a wood screw in a hard-wood nut, passing entirely through the shaft; but I do not claim this construction; but

What I claim is—

The combination of the double convex metallic plate $d$, screw-bolt $c$, disk $a$, flanged metallic nut $e$, and shaft $b$, all constructed substantially as and for the purpose described.

In testimony whereof I have signed my name to this specification in the presence of two subscribing witnesses.

JAMES BALDWIN.

Witnesses:
R. J. P. GOODWIN,
ALICE G. GOODWIN.